(12) United States Patent
Matsumoto

(10) Patent No.: US 8,687,082 B2
(45) Date of Patent: Apr. 1, 2014

(54) SOLID-STATE IMAGING DEVICE AND CAMERA SYSTEM WITH PSEUDO-THINNING-OUT PROCESSING

(75) Inventor: Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 13/067,456

(22) Filed: Jun. 2, 2011

(65) Prior Publication Data
US 2012/0008022 A1    Jan. 12, 2012

(30) Foreign Application Priority Data

Jul. 9, 2010    (JP) ................................ 2010-157336

(51) Int. Cl.
*H04N 5/228*    (2006.01)
*H04N 3/14*    (2006.01)
*H04N 5/335*    (2011.01)

(52) U.S. Cl.
USPC ........................................ 348/222.1; 348/294

(58) Field of Classification Search
USPC ........... 348/222.1, 294, 302, 230.1, 317, 319, 348/320, 321, 322, 323, 324
See application file for complete search history.

(56) References Cited

U.S. PATENT DOCUMENTS

| | | | | |
|---|---|---|---|---|
| 6,882,366 B1 * | 4/2005 | Kijima et al. | ................. | 348/294 |
| 6,885,399 B1 * | 4/2005 | Kawashiri | ..................... | 348/273 |
| 7,079,184 B2 * | 7/2006 | Yanai | ............................ | 348/319 |
| 7,385,638 B2 * | 6/2008 | Parks | ............................ | 348/311 |
| 7,492,403 B2 * | 2/2009 | Nam | .............................. | 348/311 |
| 7,612,812 B2 * | 11/2009 | Yamada | ....................... | 348/275 |
| 7,804,540 B2 * | 9/2010 | Yanai | ............................ | 348/319 |
| 8,294,774 B2 * | 10/2012 | Yamamoto | ................ | 348/208.6 |
| 2001/0030700 A1 | 10/2001 | Mabuchi et al. | | |
| 2003/0030737 A1 * | 2/2003 | Yanai | ........................... | 348/296 |
| 2006/0266923 A1 | 11/2006 | Mabuchi | | |
| 2009/0316035 A1 * | 12/2009 | Hirota | ........................... | 348/311 |
| 2010/0321517 A1 * | 12/2010 | Yamamoto | ................ | 348/222.1 |

FOREIGN PATENT DOCUMENTS

| | | |
|---|---|---|
| JP | 2001-298748 | 10/2001 |
| JP | 2005-191814 | 7/2005 |
| JP | 2006-333035 | 12/2006 |

* cited by examiner

*Primary Examiner* — Nicholas Giles
(74) *Attorney, Agent, or Firm* — Rader, Fishman & Grauer PLLC

(57) ABSTRACT

A solid-state imaging device includes: a pixel section in which a plurality of pixels converting optical signals into electric signals and accumulating the electric signals in accordance with an exposure period are arranged in a matrix shape; and a pixel driving section that is able to drive the pixel section to perform reset thereof and accumulate and output the electric signals, wherein the pixel driving section includes a vertical reading function of alternately reading pixel columns for which addition is vertically performed and pixel columns for which the addition is not performed, and a column reading function of changing the addition and normal reading whenever reading each single row in response to scanning of the vertical reading circuit, and the pixel driving section performs pseudo thinning-out reading addition equivalent to thinning-out by reading all pixels without thinning out pixels in a reading target row.

18 Claims, 13 Drawing Sheets

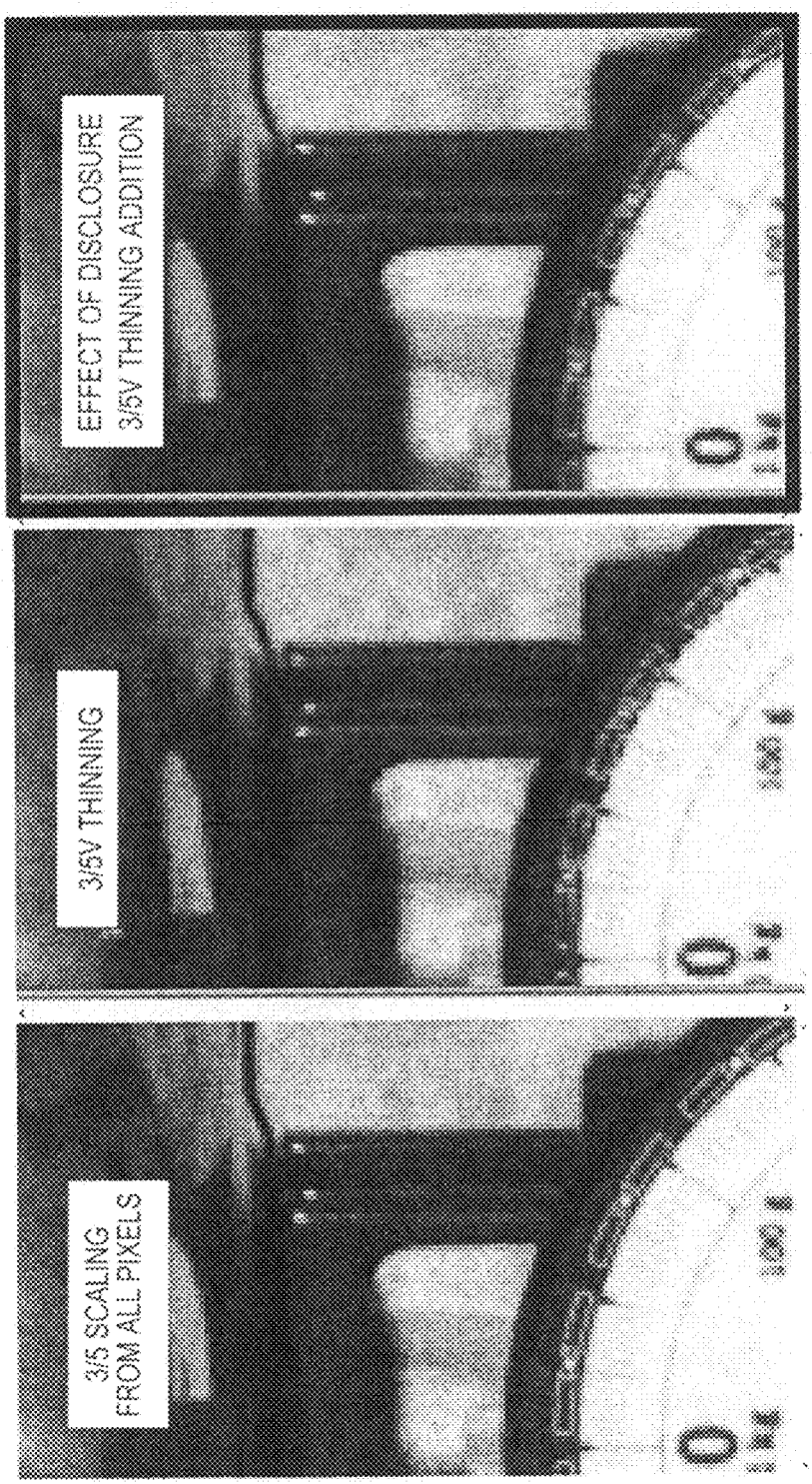

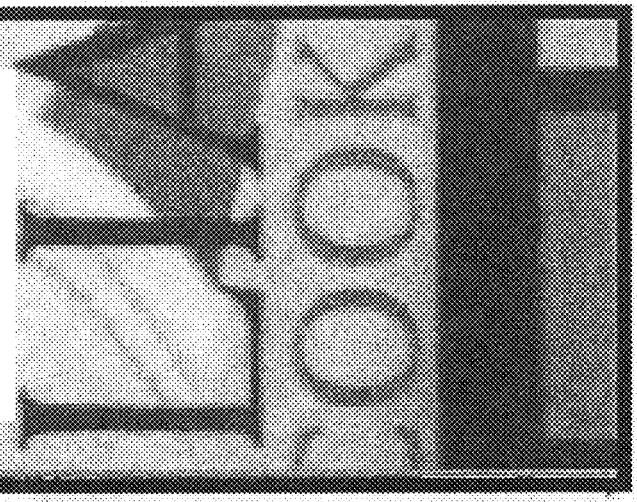
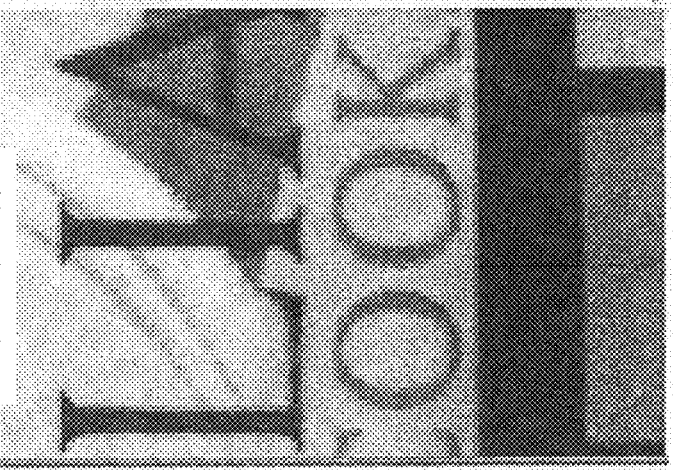
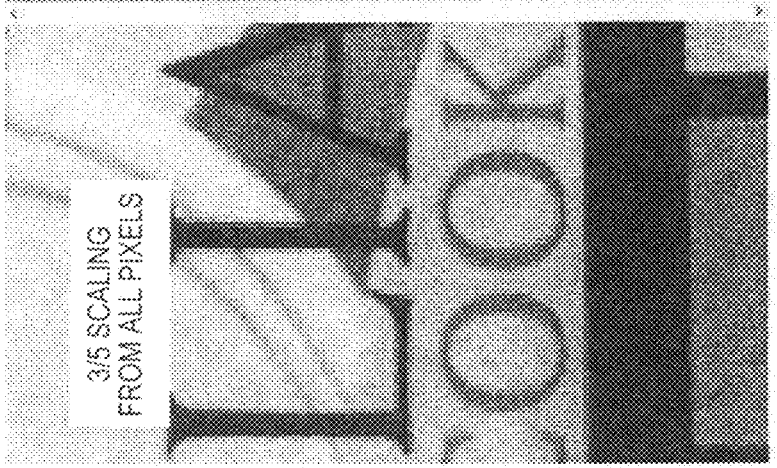

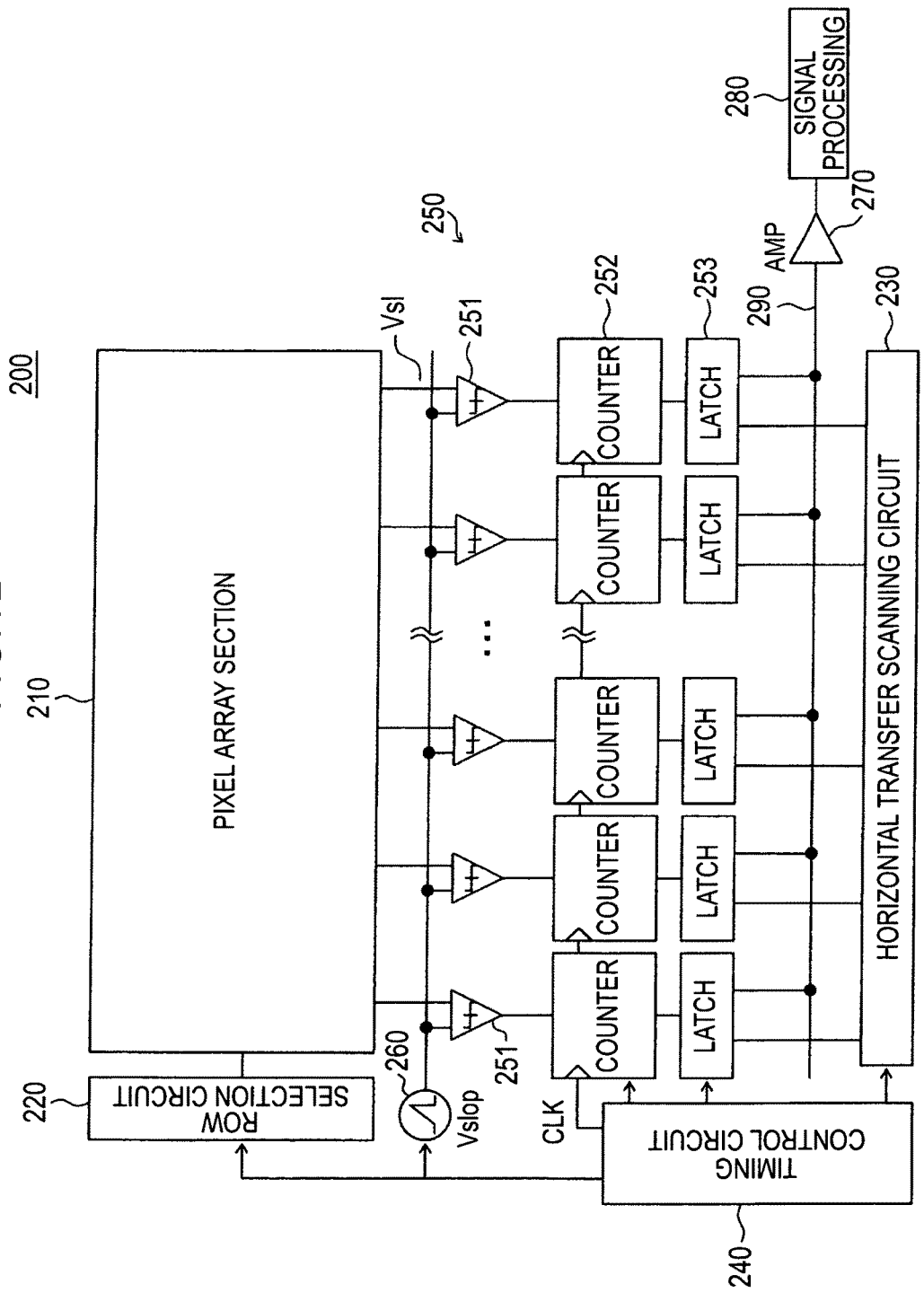

SOLID-STATE IMAGING DEVICE AND CAMERA SYSTEM WITH PSEUDO-THINNING-OUT PROCESSING

FIELD

The present disclosure relates to a solid-state imaging device typified by a CMOS image sensor and a camera system.

BACKGROUND

CMOS image sensors can be manufactured by using the same manufacturing process as typical CMOS integrated circuits, and can be driven by a single power source. Hence, by further using the CMOS process, it is possible to provide the analog circuits and the logic circuits in the same chip in a mixed manner.

Thus, there are many merits such as reduction in the number of peripheral ICs.

The dominantly used output circuit of a CCD is a single channel (ch) output type which uses a FD amplifier having a floating diffusion (FD) layer.

In contrast, since the CMOS image sensor has the FD amplifier for each pixel, the dominantly used output circuit thereof is a column-parallel output type in which a single row in the pixel array is selected and the entire row is simultaneously read in the column direction.

It is difficult for the FD amplifier, which is disposed in each pixel, to exhibit a sufficient driving capability, and thus it is necessary to lower the data rate. This is a reason why parallel processing is advantageous.

FIG. 1 is a diagram illustrating an exemplary pixel of a CMOS image sensor constituted by four transistors.

The pixel 1 has a photoelectric conversion device 11 formed of, for example, a photodiode.

The pixel 1 has the following four transistors as active devices per single photoelectric conversion device 11: a transfer transistor 12, a reset transistor 13, an amplifier transistor 14, and a selection transistor 15.

The photoelectric conversion device 11 photoelectrically converts incident light into electric charges (here electrons) of which the amount corresponds to the amount of the light.

The transfer transistor 12 is connected between the photoelectric conversion device 11 and the floating diffusion FD. The transfer transistor 12 transfers electrons, which are photoelectrically converted by the photoelectric conversion device 11, to the floating diffusion FD when the gate (a transfer gate) thereof receives a drive signal through the transfer control line LTx.

The reset transistor 13 is connected between a power source line LVDD and a floating diffusion FD. The reset transistor 13 resets the electric potential of the floating diffusion FD to the electric potential of the power source line LVDD when the gate thereof receives a reset signal through the reset control line LRST.

The floating diffusion FD is connected to the gate of the amplifier transistor 14. The amplifier transistor 14 is connected to a signal line 16 through the selection transistor 15. The amplifier transistor 14 and a constant current source outside the pixel section constitute a source follower.

In addition, through the selection control line LSEL, an address signal (a select signal) can be given to the gate of the selection transistor 15. Thereby, when the selection transistor 15 is turned on, the amplifier transistor 14 amplifies the electric potential of the floating diffusion FD, and outputs the voltage corresponding to the electric potential to the signal line 16. Through the signal line 16, the voltage, which is output from each pixel, is output to the column circuit (a column processing circuit).

The reset operation of the pixel is defined as an operation of discharging electric charges, which are accumulating in the photoelectric conversion device 11, by turning on the transfer transistor 12 and transferring the electric charges accumulated in the photoelectric conversion device 11 to the floating diffusion FD.

At this time, in order to receive the electric charges of the photoelectric conversion device 11, the floating diffusion FD discharges electric charges to the power source side in advance by turning on the reset transistor 13. Alternatively, in some cases, while turning on the transfer transistor 12 is performed, in parallel with this, the reset transistor 13 is turned on, thereby directly discharging the electric charges to the power source.

This series of operations is a "pixel reset operation".

On the other hand, in the reading operation, first by turning on the reset transistor 13, the floating diffusion FD is reset, and in this state, an output is given to the output signal line 16 through the selection transistor 15 which is turned on. This output is called a P-phase output.

Next, by turning on the transfer transistor 12, the electric charges, which are accumulated in the photoelectric conversion device 11, are transferred to the floating diffusion FD, and then the output thereof is given to the output signal line 16. This output is called a D-phase output.

The difference between the D-phase output and the P-phase output is acquired from the outside of the pixel circuit, and the reset noise of the floating diffusion FD is canceled, thereby obtaining an image signal.

This series of the operations is a "pixel reading operation".

FIG. 2 is a diagram illustrating a typical configuration example of a CMOS image sensor (a solid-state imaging device) in which the pixels of FIG. 1 are disposed in a 2-dimensional array shape.

The CMOS image sensor 20 of FIG. 2 includes a pixel section 21 in which the pixel circuits shown in FIG. 1 are disposed in a 2-dimensional array shape, a pixel driving circuit (a vertical driving circuit) 22, and a column circuit (a column processing circuit) 23.

The pixel driving circuit 22 controls the ON/OFF states of the transfer transistors 12, the reset transistors 13, and the selection transistors 15 of the pixels in each row.

The column circuit 23 is a circuit that receives the data on the row of pixels for which the reading is controlled by the pixel driving circuit 22 and transfers the data to the signal processing circuit at the subsequent stage.

The solid-state imaging, device having such configuration has been used as an image input apparatus in various portable terminal devices, digital still cameras, digital single-lens reflex cameras, digital video cameras, and the like.

In addition, the solid-state imaging device is capable of not only the sequential reading operation but also various reading operations in accordance with the application thereof (for example, refer to JP-A-2001-298748, JP-A-2005-191814, and JP-A-2006-333035).

For example, when reading at a high speed frame is intended to be performed rather than the sequential reading of the entire pixels, the 3-row thinning-out addition reading and the like are performed.

SUMMARY

In the solid-state imaging device mentioned above, in recent years, in accordance with an increase in the number of pixels and an increase in the frame rate, a technique corresponding to the high-speed reading has become important. For example, in the technique, in the case of a still image, all the pixels are read, and in the case of a moving image, the spatially arranged pixels are thinned out and read.

Regarding this thinning-out, hitherto, in the CMOS image sensor, with combination of the vertical (V) address scanning and reading circuit, the thinning-out and pixel addition in the vertical direction have been performed.

In this case, like the ½ thinning-out and the ⅓ thinning-out, normally a thinning-out addition, in which the denominator is set to 2 or more when the numerator is set to 1, is performed.

The thinning-out, in which the denominator is set to 2 or more (such as 3 and 5), can be addressed in the method of the related art as shown in FIG. 3. However, the thinning-out of the pixels is infrequently performed, and thus image quality deteriorates.

Thus, it is desirable to provide a solid-state imaging device and a camera system capable of performing flexible thinning-out without deteriorating image quality.

An embodiment of the present disclosure is directed to a solid-state imaging device including: a pixel section in which a plurality of pixels converting optical signals into electric signals and accumulating the electric signals in accordance with an exposure period are arranged in a matrix shape; and a pixel driving section that is able to drive the pixel section to perform reset thereof and accumulate and output the electric signals. The pixel driving section has a vertical reading function of alternately reading pixel columns for which addition is vertically performed and pixel columns for which the addition is not performed, and a column reading function of changing the addition and normal reading whenever reading each single row in response to scanning of the vertical reading circuit. The pixel driving section performs pseudo thinning-out reading addition equivalent to thinning-out by reading all pixels without thinning out pixels in a reading target row.

Another embodiment of the present disclosure is directed to a camera system including: a solid-state imaging device; an optical system that forms a subject image on the solid-state imaging device; and a signal processing circuit that processes an output image signal of the solid-state imaging device. The solid-state imaging device includes a pixel section in which a plurality of pixels converting optical signals into electric signals and accumulating the electric signals in accordance with an exposure period are arranged in a matrix shape; and a pixel driving section that is able to drive the pixel section to perform reset thereof and accumulate and output the electric signals. The pixel driving section has a vertical reading function of alternately reading pixel columns for which addition is vertically performed and pixel columns for which the addition is not performed, and a column reading function of changing the addition and normal reading whenever reading each single row in response to scanning of the vertical reading circuit. The pixel driving section performs pseudo thinning-out reading addition equivalent to thinning-out by reading all pixels without thinning out pixels in a reading target row.

According to the embodiments of the present disclosure, it is possible to perform the flexible thinning-out without deteriorating image quality.

BRIEF DESCRIPTION OF THE DRAWINGS

FIGS. 10A, 10B, and 10C are first diagrams illustrating a scaled image, an image subjected to normal thinning-out processing, and an image subjected to the pseudo thinning-out addition processing according to the embodiment in a comparative manner;

FIGS. 11A, 11B, and 11C are second diagrams illustrating a scaled image, an image subjected to normal thinning-out processing, and an image subjected to the pseudo thinning-out addition processing according to the embodiment in a comparative manner;

FIG. 12 is a block diagram illustrating an exemplary configuration of a solid-state imaging device (a CMOS image sensor) equipped with column-parallel ADC according to the embodiment.

DETAILED DESCRIPTION

Hereinafter, embodiments of the present disclosure will be described with reference to the accompanying drawings.

Furthermore, the description will be given in order of the following items.
1. Exemplary Configuration of CMOS Image Sensor (Solid-State Imaging Device)
2. Pseudo-Multi-Row Thinning-Out Addition Reading Function
3. Other Exemplary Configuration of CMOS Image Sensor (Solid-State Imaging Device)
4. Exemplary Configuration of Camera System <1. Exemplary Configuration of CMOS Image Sensor (Solid-State Imaging Device)>

Figure 1:
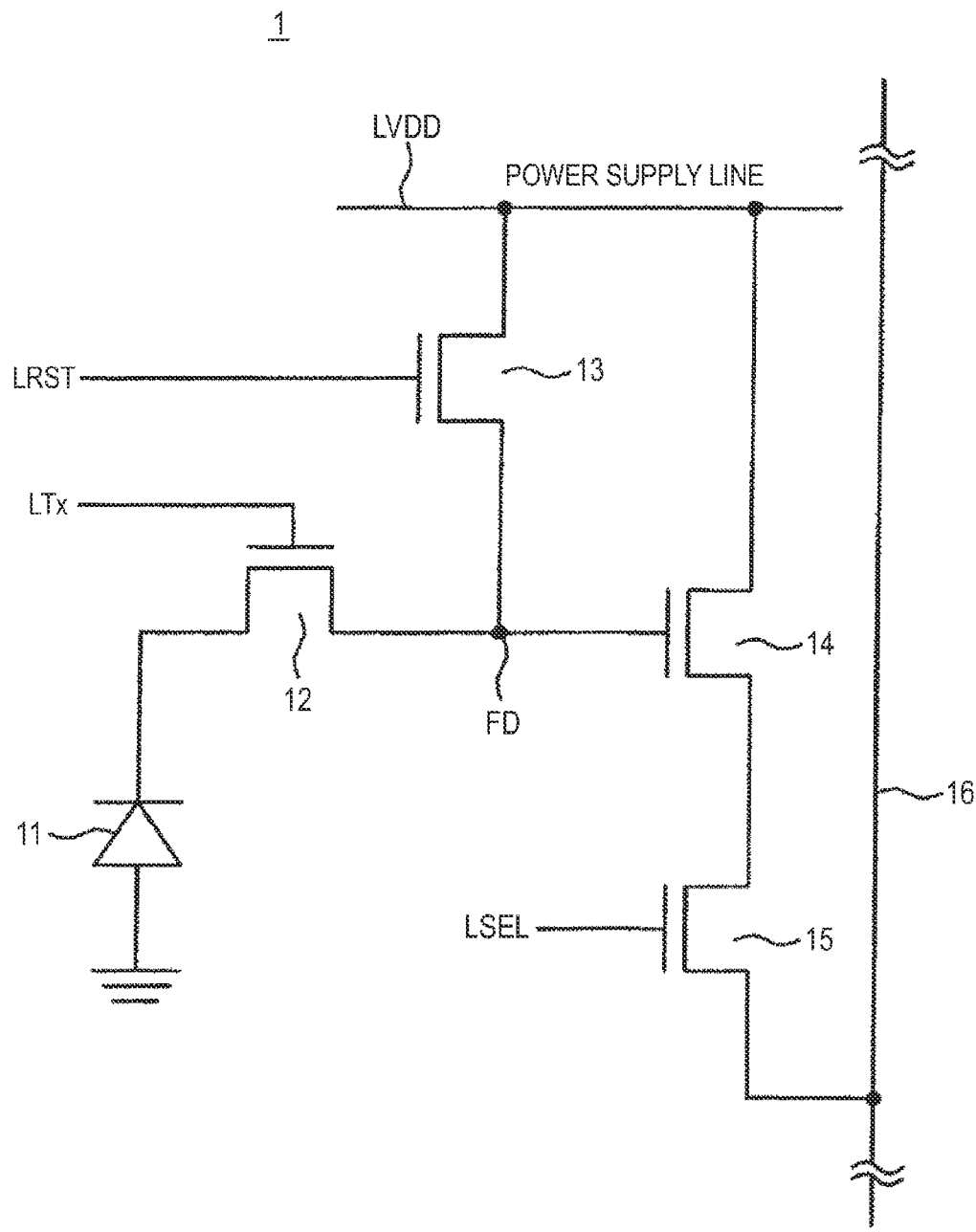
FIG. 1 is a diagram illustrating an exemplary pixel of a CMOS image sensor constituted by four transistors.
Figure 2:
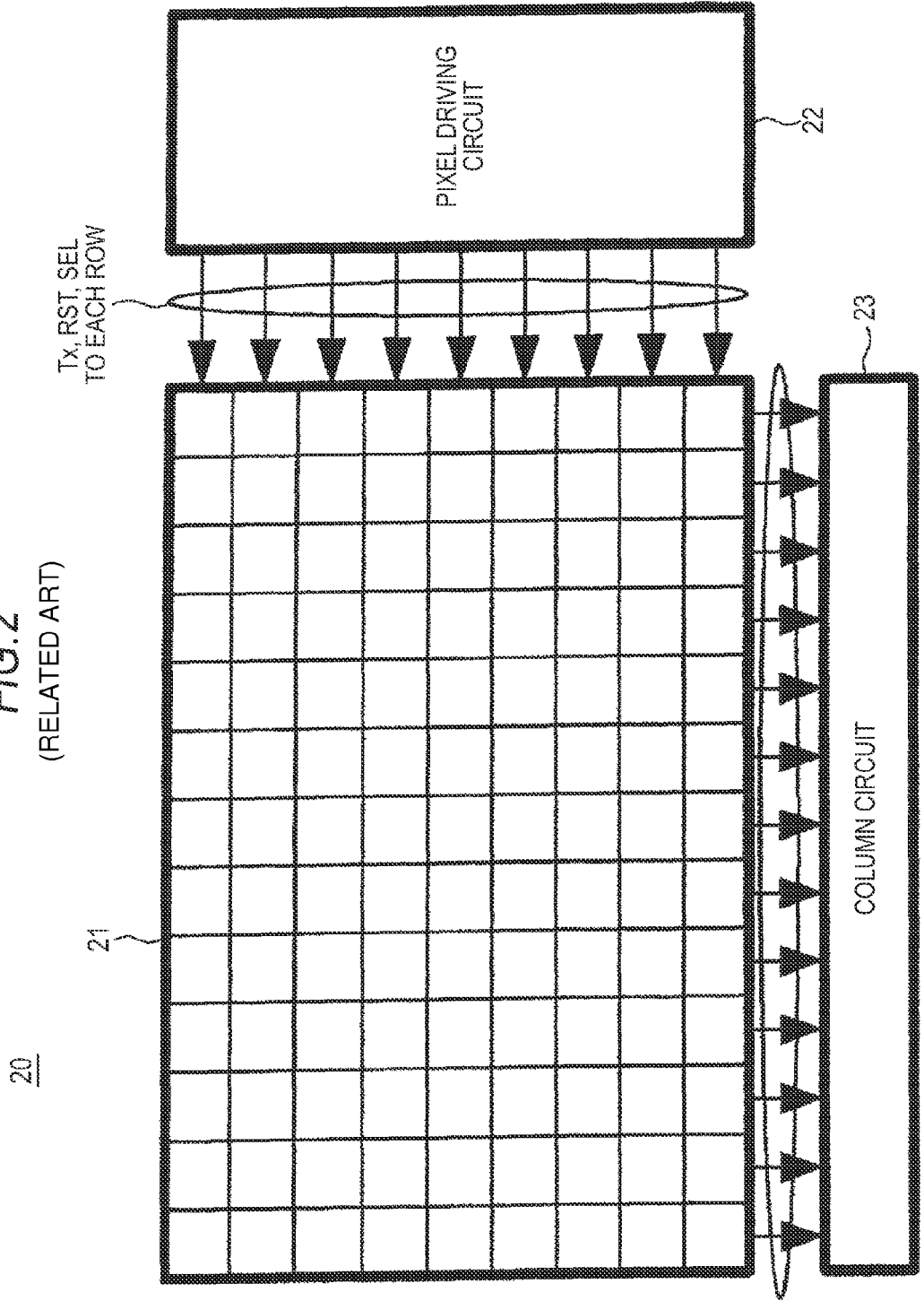
FIG. 2 is a diagram illustrating a typical exemplary configuration of a CMOS image sensor (a solid-state imaging device) in which the pixels of FIG. 1 are disposed in a 2-dimensional array shape.
Figure 3:
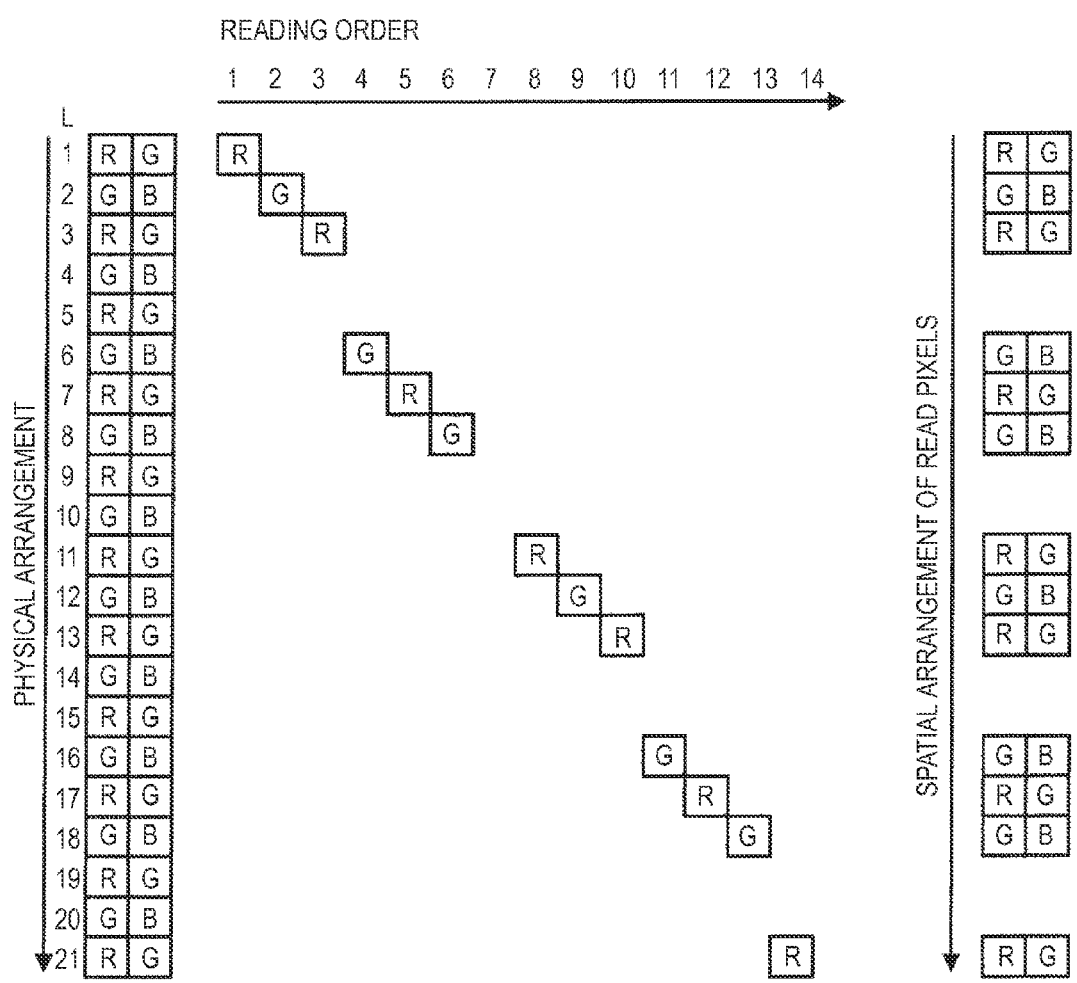
FIG. 3 is a diagram schematically illustrating ⅗ thinning-out reading processing in the related art.
Figure 4:
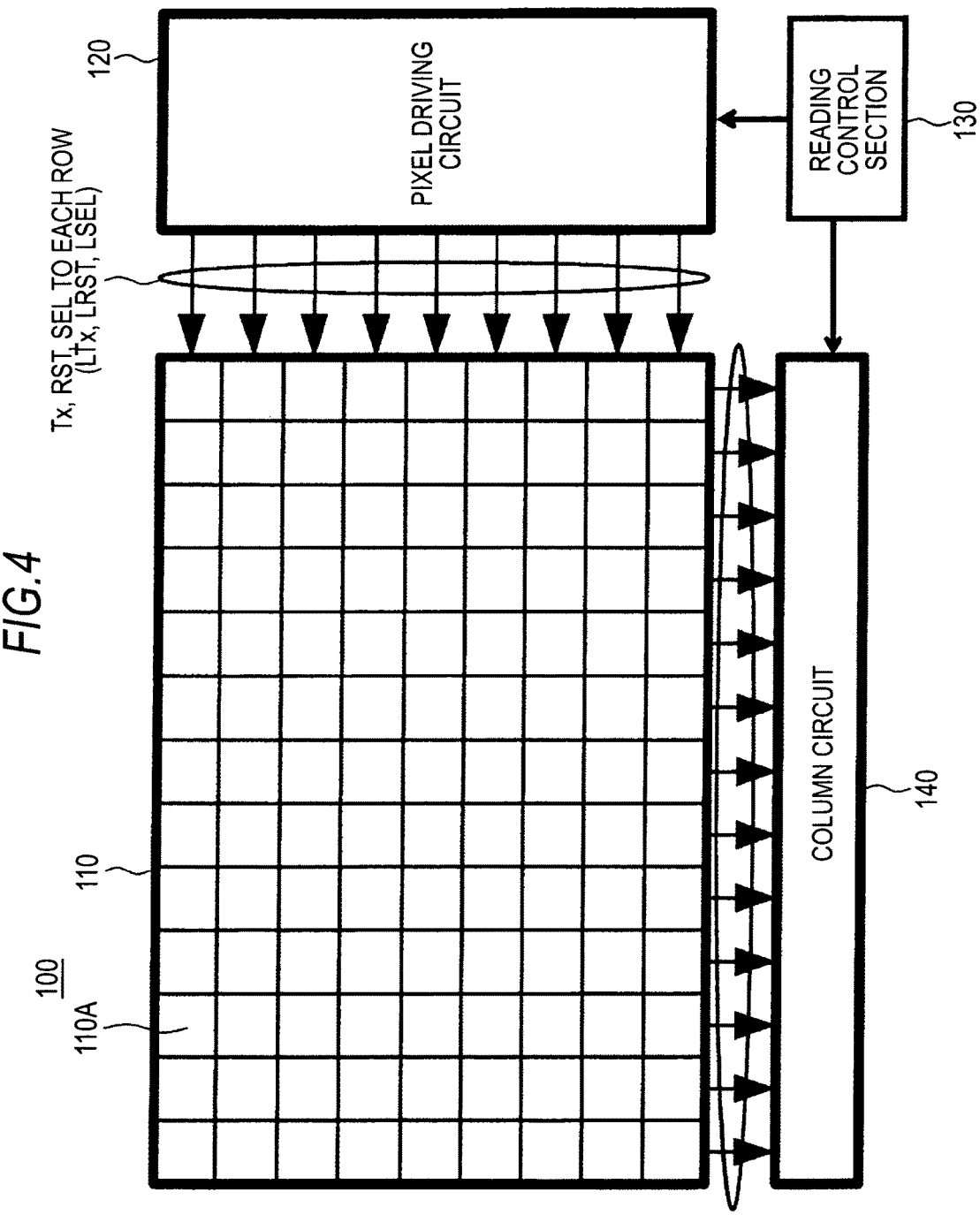
FIG. 4 is a diagram illustrating an exemplary configuration of a CMOS image sensor (a solid-state imaging device) according to an embodiment of the present disclosure.

FIG. 4 is a diagram illustrating an exemplary configuration of a CMOS image sensor (a solid-state imaging device) according to an embodiment of the present disclosure.

The CMOS image sensor 100 has a pixel section 110, a pixel driving circuit (a vertical driving circuit) 120 as a vertical reading circuit of a pixel driving section, a reading control section 130, and a column reading circuit (a column processing circuit) 140 forming the pixel driving section.

In the pixel section 110, a plurality of pixels 110A are formed in a 2-dimensional array (a matrix shape).

Figure 5:
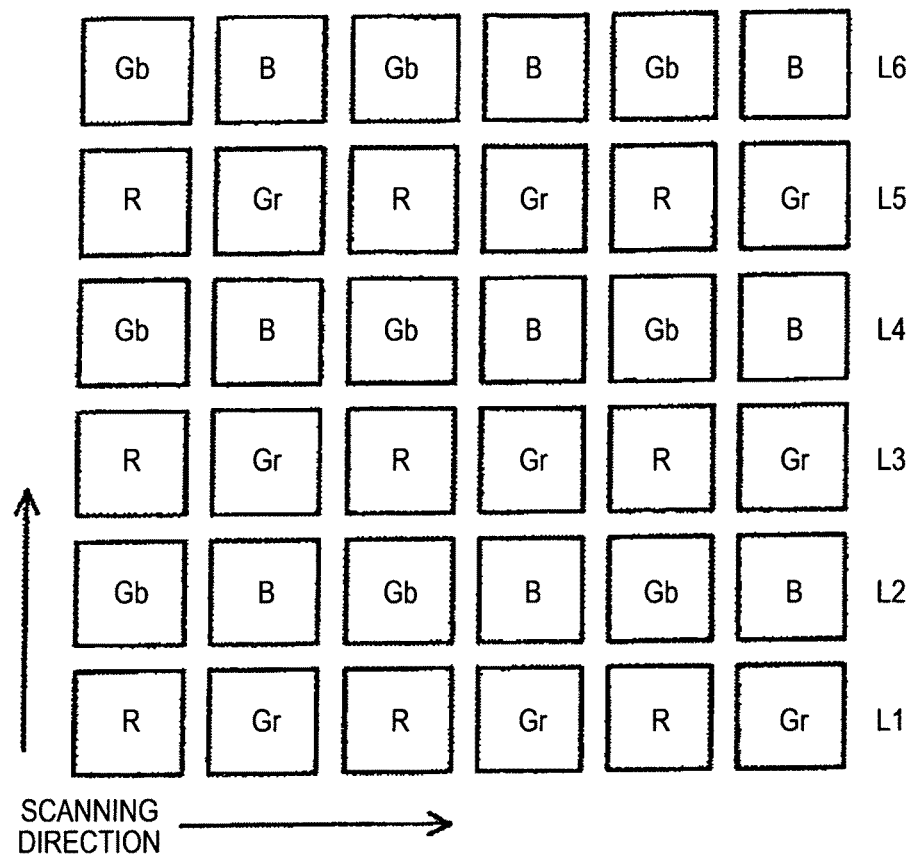
FIG. 5 is a diagram illustrating a Bayer array.

In the pixel section 110, color pixels, for example, R, Gr, Gb, and B are formed in the array shown in FIG. 5, that is, a Bayer array.

Figure 6:
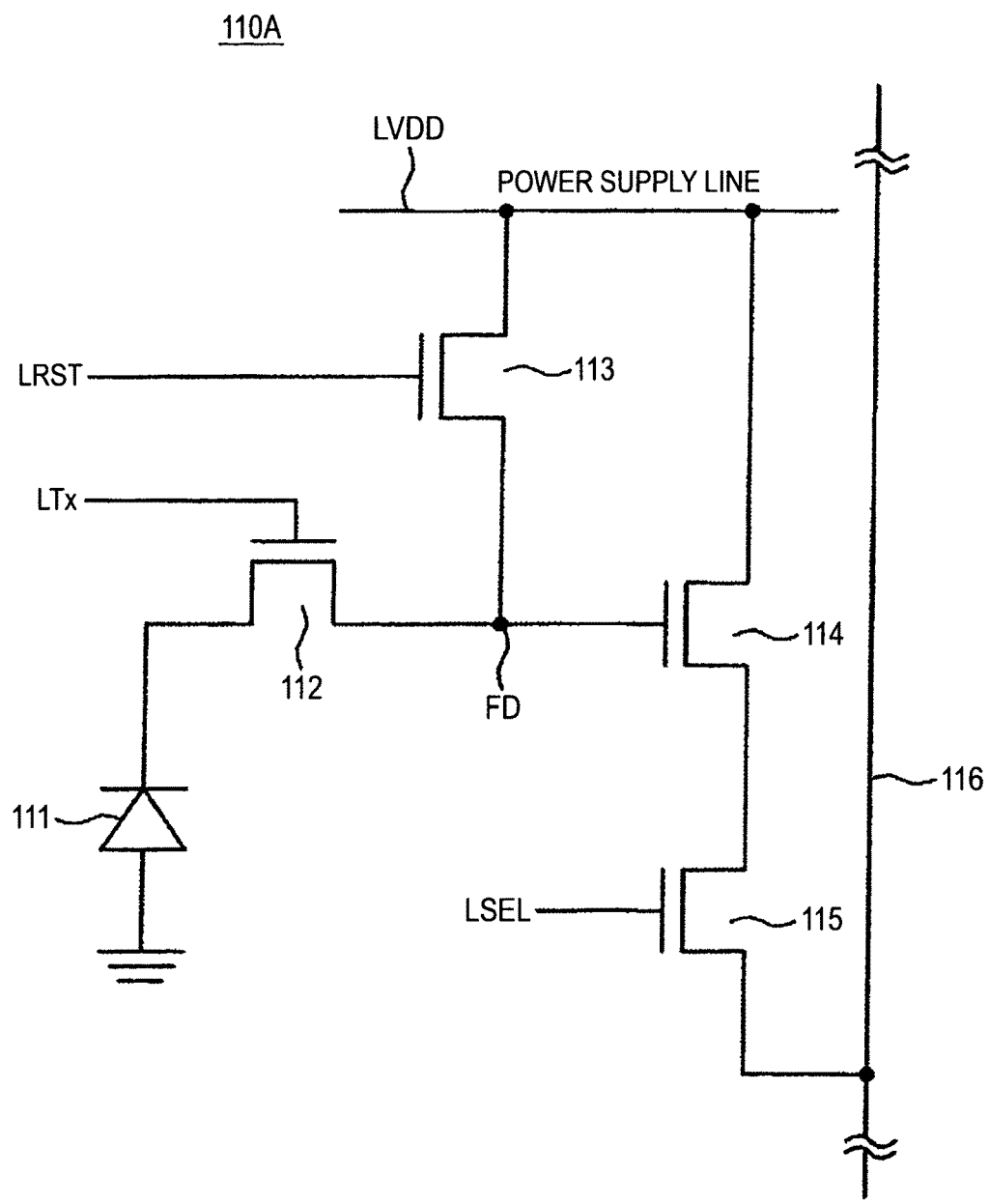
FIG. 6 is a diagram illustrating an exemplary pixel of a CMOS image sensor constituted by four transistors according to the embodiment.

FIG. 6 is a diagram illustrating an example of a common pixel of a CMOS image sensor constituted by four transistors according to the embodiment.

A pixel 110A illustrated in FIG. 6 includes a photoelectric conversion device 111 formed of, for example, a photodiode. The pixel 110A further includes the following four transistors as active devices per photoelectric conversion device 111: a transfer transistor 112, a reset transistor 113, an amplifier transistor 114, and a selection transistor 115.

The photoelectric conversion device 111 photoelectrically converts incident light into electric charges (here electrons) of which the amount corresponds to the amount of the light.

The transfer transistor 112 is connected between the photoelectric conversion device 111 and the floating diffusion FD. The transfer transistor 112 transfers electrons, which are photoelectrically converted by the photoelectric conversion device 111, to the floating diffusion FD when the gate (a transfer gate) thereof receives a control signal Tx through the transfer control line LTx.

The reset transistor 113 is connected between a power source line LVDD and a floating diffusion FD. The reset transistor 113 resets the electric potential of the floating diffusion FD to the electric potential of the power source line LVDD when the gate thereof receives a control signal RST through the reset control line LRST.

The floating diffusion FD is connected to the gate of the amplifier transistor 114. The amplifier transistor 114 is connected to a signal line 116 through the selection transistor 115. The amplifier transistor 114 and a constant current source outside the pixel section constitute a source follower.

In addition, through the selection control line LSEL, a control signal (an address signal or a select signal) SEL can be given to the gate of the selection transistor 115, and thereby the selection transistor 115 is turned on. Then, the amplifier transistor 114 amplifies the electric potential of the floating diffusion FD, and outputs the voltage corresponding to the electric potential to the signal line 116. Through the signal line 116, the voltage, which is output from each pixel, is output to the column reading circuit 140.

For example, the respective gates of the transfer transistor 112, the reset transistor 113, and the selection transistor 115 are connected on a row-by-row basis. Accordingly, such an operation is simultaneously performed, in parallel, on each pixel corresponding to a single row.

The pixel driving circuit 120 outputs, under control of the reading control section 130, each control signal to a control line to which each of the reset control line LRST, the transfer control line LTx, and the selection control line LSEL is connected.

By causing the pixel driving circuit 120 to drive the pixels, without performing the thinning-out on the pixels, reading equivalent to multi-row thinning-out addition reading such as ⅔ thinning-out or ⅗ thinning-out is performed.

The pixel driving circuit 120 is able to drive the pixel section 110 to perform reset thereof and accumulate and output signals.

The pixel driving circuit 120 is able to alternately read, under the control of the reading control section, pixel columns for which addition is vertically performed and pixel columns for which the addition is not performed.

The pixel driving circuit 120 is able to drive the pixel section 110 to perform the pseudo thinning-out addition reading for each color pixel. The pixel driving circuit 120 drives the pixel section to alternately perform reading addition of a plurality of first-color pixels (for example, R pixels) and reading addition of a plurality of second-color pixels (for example, G pixels).

When successively performing pseudo unit thinning-out a plurality of times, the pixel driving circuit 120 drives the pixel section to perform the normal reading at the boundary between the pseudo unit thinning-out operations which are continuously performed.

In the pixel section 110 of the embodiment, in a single column, first-color pixels (the R pixels) are arranged in odd rows L1, L3, L5, and so on, and second-color pixels (the G pixels) are arranged in even rows L2, L4, L6, and so on. In some cases, the first-color pixels (the R pixels) are disposed in even rows, and the second-color pixels (the G pixels) are disposed in odd rows.

In an adjacent column, third-color pixels (the G pixels) are arranged in odd rows L1, L3, L5, and so on, and fourth-color pixels (B pixels) are arranged in even rows L2, L4, L6, and so on. In some cases, the third-color pixels (the G pixels) are disposed in even rows, and the fourth-color pixels (the B pixels) are disposed in odd rows.

In addition, the pixel driving circuit 120 drives the pixel section to perform the pseudo thinning-out addition reading on the plurality of rows, which have a sequence of alternating single rows of the first-color pixels (the R pixels) and the second-color pixels (the G pixels) alternately repeated, for example two rows, as a reading unit RDUT for a single pseudo thinning-out.

The pixel driving circuit 120 drives the pixel section to perform the thinning-out addition reading once on, for example, the reading unit RDUT of the first-color pixels (the R pixels) which are read first. Subsequently, the pixel driving circuit 120 drives the pixel section 110 to perform the pseudo thinning-out addition reading on the second-color pixels (the G pixels) whose color is different from that of the first-color pixels (the R pixels), and perform pseudo unit thinning-out for performing the normal reading on the first-color pixels (the R pixels) in the subsequent row.

In the embodiment, the thinning-out unit is represented by the reference sign THUT.

When successively performing pseudo unit thinning-out a plurality of times, the pixel driving circuit 120 reverses the order of the reading addition of the first-color pixels (the R pixels) and the reading addition of the second-color pixels (the G pixels) in the subsequent unit reading.

Then, the pseudo thinning-out addition reading is performed once on the reading unit RDUT of the second-color pixels (the G pixels) which are read first. Subsequently, the pixel driving, circuit 120 drives the pixel section 110 to perform the pseudo thinning-out addition reading on the first-color pixels (the R pixels) whose color is different from that of the second-color pixels (the G pixels), and perform the pseudo unit thinning-out to perform the normal reading on the second-color pixels (the G pixels) in the subsequent row.

The reading control section 130 controls the respective multi-row reading processing operations such as odd-row addition reading processing and even-row addition reading processing through the pixel driving circuit 120 and the column reading circuit 140.

The column reading circuit 140 has a function of: receiving, under the control of the reading control section 130, data on the row of pixels for which the reading is controlled by the pixel driving circuit 120; and changing the addition and normal reading whenever reading each single row in response to the scanning of the pixel driving circuit 120 as a vertical reading circuit.

The column reading circuit 140 is a circuit that transfers the processed signals to the signal processing circuit at the subsequent stage.

<2. Pseudo Multi-Row Thinning-Out Addition Reading Function>

Hereinafter, the pseudo multi-row thinning-out addition reading function, which is a distinctive function of the embodiment, will be described with reference to a given specific example.

Here, first, reading in the case of ⅗-row thinning-out addition will be described with reference to, for example, FIG. 7.

Figure 7:
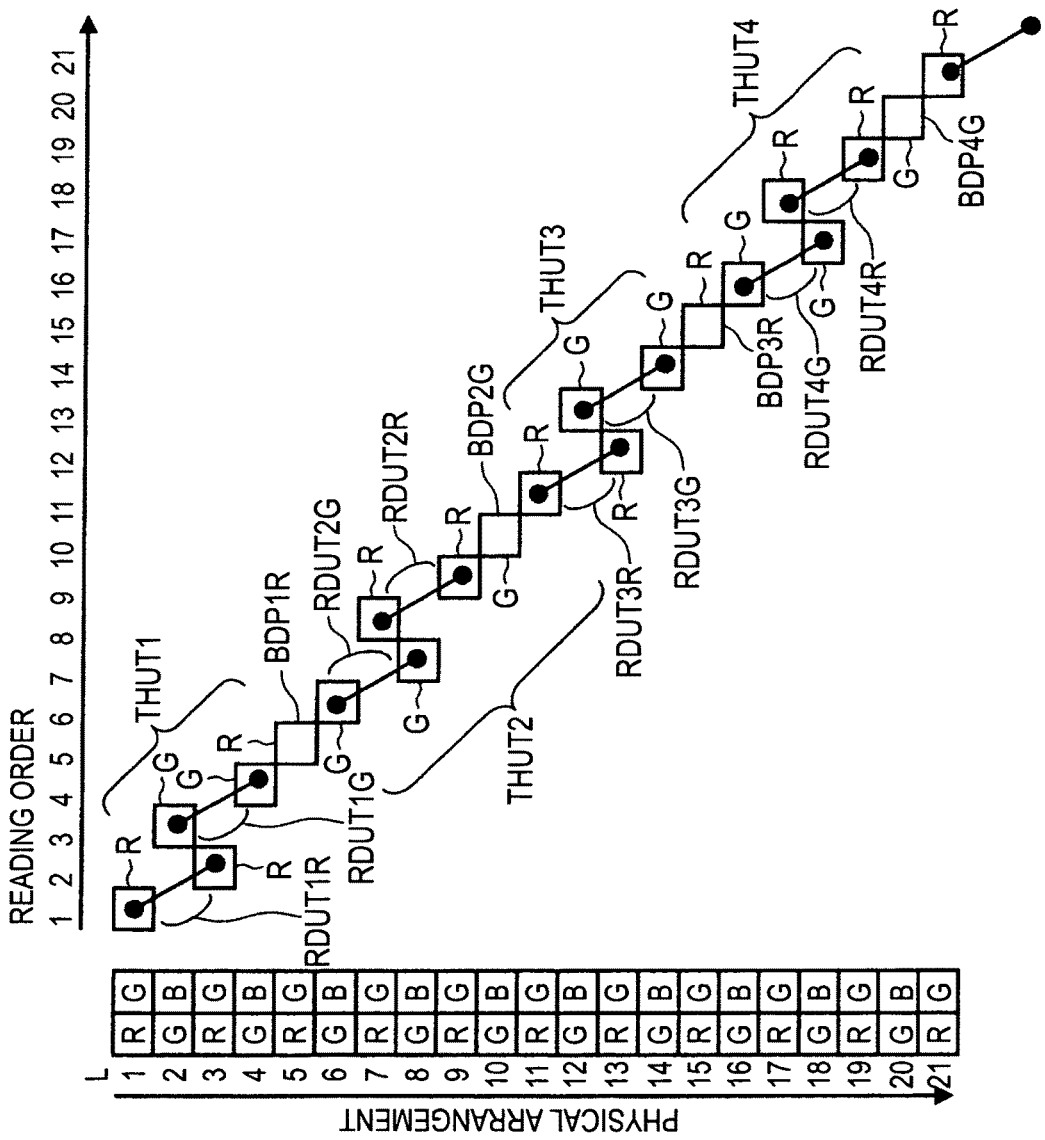
FIG. 7 is a diagram illustrating an example of reading in a case of pseudo ⅗-row thinning-out addition which does not perform thinning-out according to the embodiment.

FIG. 7 is a diagram illustrating an example of reading in a case of pseudo ⅗-row thinning-out addition which does not perform thinning-out according to the embodiment.

In the example of FIG. 7, the first-color pixels are the R pixels, and the second-color pixels are the B pixels.

As shown in FIG. 7, in the first column, first-color pixels (the R pixels) are arranged in odd rows L1, L3, L5, and so on, and second-color pixels (the G pixels) are arranged in even rows L2, L4, L6, and so on.

In the adjacent second column, third-color pixels (the G pixels) are arranged in odd rows L1, L3, L5, and so on, and fourth-color pixels (B pixels) are arranged in even rows L2, L4, L6, and so on.

In this case, the above processing is ⅗-row thinning-out addition reading processing for reading three rows from five successive rows.

In the first pseudo thinning-out unit THUT1, the R pixels in the first row L1 and the third row L3, which are odd rows, form the first reading unit RDUT1R of the R pixels.

The G pixels in the second row L2 and the fourth row L4, which are even rows, form the first reading unit RDUT1G of the G pixels.

Then, the R pixel in the fifth row L5 forms the boundary pixel BDP1R of the pseudo thinning-out unit THUT.

Subsequently, in the second pseudo thinning-out unit THUT2, the G pixels in the sixth row L6 and the eighth row L8, which are even rows, form the second reading unit RDUT2G of the G The R pixels in the seventh row L7 and the ninth row L9, which are odd rows, form the second reading unit RDUT2R of the R pixels.

Then, the G pixel in the tenth row L10 forms the boundary pixel BDP2G of the pseudo thinning-out unit THUT.

Subsequently, in the third pseudo thinning-out unit THUT3, the R pixels in the eleventh row L11 and the thirteenth row L13, which are odd rows, form the third reading unit RDUT3R of the R pixels.

The G pixels in the twelfth row L12 and the fourteenth row L14, which are even rows, form the third reading unit RDUT3G of the G pixels.

Then, the R pixel in the fifteenth row L15 forms the boundary pixel BDP3R of the pseudo thinning-out unit THUT.

Subsequently, in the fourth pseudo thinning-out unit THUT4, the G pixels in the sixteenth row L16 and the eighteenth row L18, which are even rows, form the fourth reading unit RDUT4G of the G pixels.

The R pixels in the seventeenth row L17 and the nineteenth row L19, which are odd rows, form the fourth reading unit RDUT4R of the R pixels.

Then, the G pixel in the twentieth row L20 forms the boundary pixel BDP4G of the pseudo thinning-out unit THUT.

That is, the pseudo thinning-out reading addition processing of such a first pseudo thinning-out unit THUT1 is performed as follows.

In the first pseudo thinning-out unit THUT1, the R pixels in the first row L1 are read first, and the R pixels in the third row L3 are read second. Thereby, the first reading unit RDUT1R of the R pixels is formed, and the addition of the R pixels in both rows is performed.

The G pixels in the second row L2 are read third, and the G pixels in the fourth row L4 are read fourth. Thereby, the first reading unit RDUT1G of the G pixels is formed, and thus the addition of the G pixels in both rows is performed.

Then, the R pixel in the fifth row L5 is normally read fifth. Thereby, the boundary pixel BDP1R of the pseudo thinning-out unit THUT is formed.

As described above, the pseudo thinning-out reading addition processing of the first pseudo thinning-out unit THUT1 is performed.

Next, the pseudo thinning-out reading addition processing of the second pseudo thinning-out unit THUT2 is performed.

Subsequently, in the second pseudo thinning-out unit THUT2, the G pixels in the sixth row L6, which is an even row, are read sixth, and the G pixels in the eighth row L8 are read seventh. Thereby, the second reading unit RDUT2G of the G pixels is formed, and thus the addition of the pixels in both rows is performed.

Then, the R pixels in the seventh row L7 are read eighth, and the R pixels in the ninth row L9 are read ninth. Thereby, the second reading unit RDUT2R of the R pixels is formed, and thus the addition of the pixels in both rows is performed.

Then, the G pixel in the tenth row L10 is normally read tenth. Thereby, the boundary pixel BDP2G of the pseudo thinning-out unit THUT2 is formed.

As described above, the pseudo thinning-out reading addition processing of the second pseudo thinning-out unit THUT2 is performed.

Next, the pseudo thinning-out reading addition processing of the third pseudo thinning-out unit THUT3 is performed.

Subsequently, in the third pseudo thinning-out unit THUT3, the R pixels in the eleventh row L11 are read eleventh, and the R pixels in the thirteenth row L13 are read twelfth. Thereby, the third reading unit RDUT3R of the R pixels is formed, and thus the addition of the pixels in both rows is performed.

Then, the G pixels in the twelfth row L12 are read thirteenth, and the G pixels in the fourteenth row L14 are read fourteenth. Thereby, the third reading unit RDUT3G of the G pixels is formed, and thus the addition of the pixels in both rows is performed.

Then, the R pixel in the fifteenth row L15 is normally read fifteenth. Thereby, the boundary pixel BDP3R of the pseudo thinning-out unit THUT is formed.

As described above, the pseudo thinning-out reading addition processing of the third pseudo thinning-out unit THUT3 is performed.

Next, the pseudo thinning-out reading addition processing of the fourth pseudo thinning-out unit THUT4 is performed.

Subsequently, in the fourth pseudo thinning-out unit THUT4, the G pixels in the sixteenth row L16 are read sixteenth, and the G pixels in the eighteenth row L18 are read seventeenth. Thereby, the fourth reading unit RDUT4G of the G pixels is formed, and thus the addition of the pixels in both rows is performed.

Then, the R pixels in the seventeenth row L17 are read eighteenth, and the R pixels in the nineteenth row L19 are read nineteenth. Thereby the fourth reading unit RDUT4R of the R pixels is formed, and thus the addition of the pixels in both rows is performed.

Then, the G pixel in the twentieth row L20 is normally read twentieth. Thereby, the boundary pixel BDP4G of the pseudo thinning-out unit THUT4 is formed.

Hereinafter, the processing is repeated in the same manner.

Further, the processing is also performed on other columns in the same manner.

Figure 8:
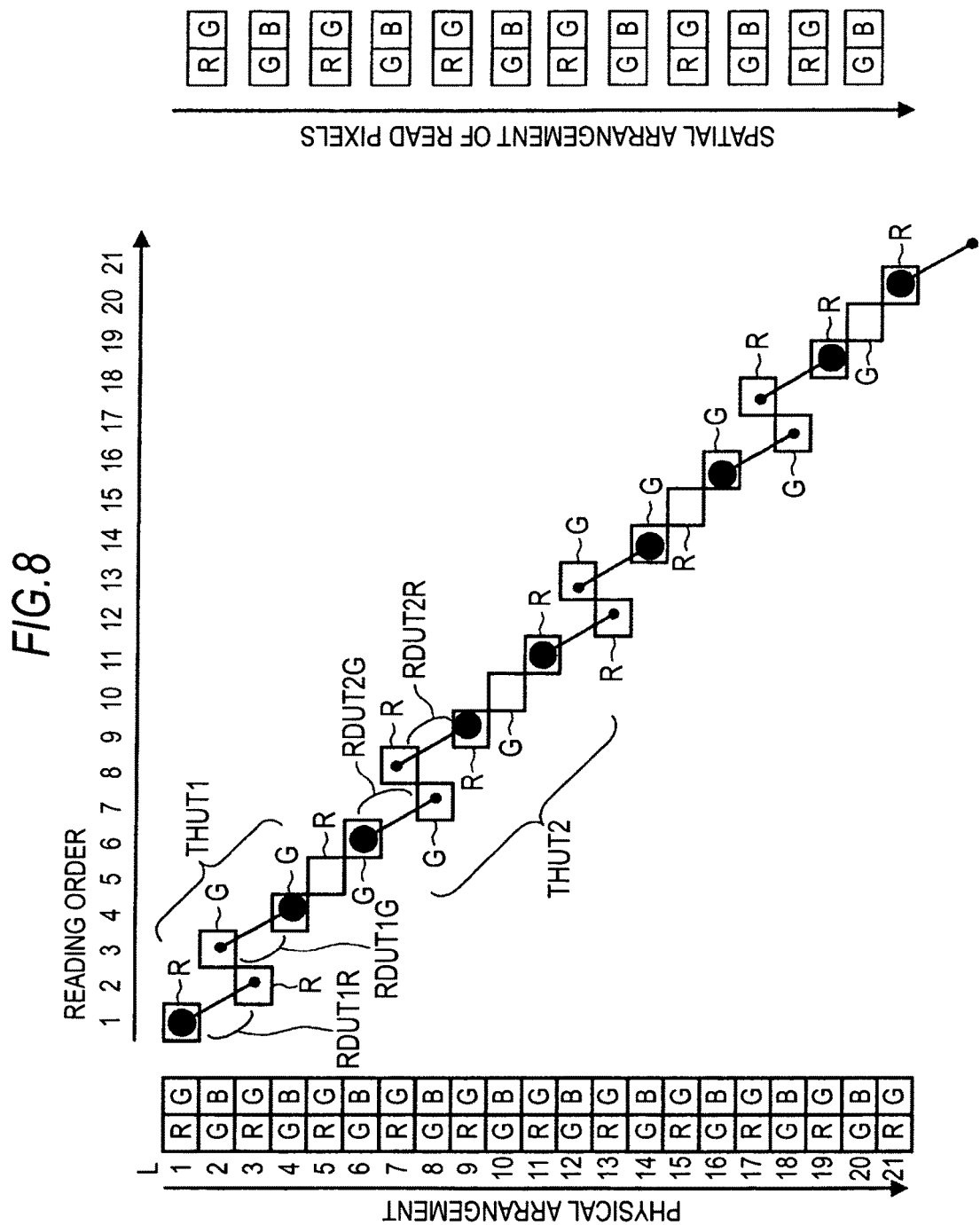
FIG. 8 is a diagram illustrating another example of reading in the case of the pseudo ⅗-row thinning-out addition which does not perform thinning-out according to the embodiment.

FIG. 8 is a diagram illustrating another example of reading in the case of the pseudo ⅗-row thinning-out addition which does not perform thinning-out according to the embodiment.

The example of FIG. 8 is different from FIG. 7 in that weighted addition is applied to the addition processing for each reading unit RDUT which is read.

Other configurations are similar to the example of FIG. 7.

Here, applicable field of the present disclosure will be described.

The embodiment of the present disclosure can be applied to all multi-row addition reading regardless of whether odd-row addition or even-row addition.

Figure 9:
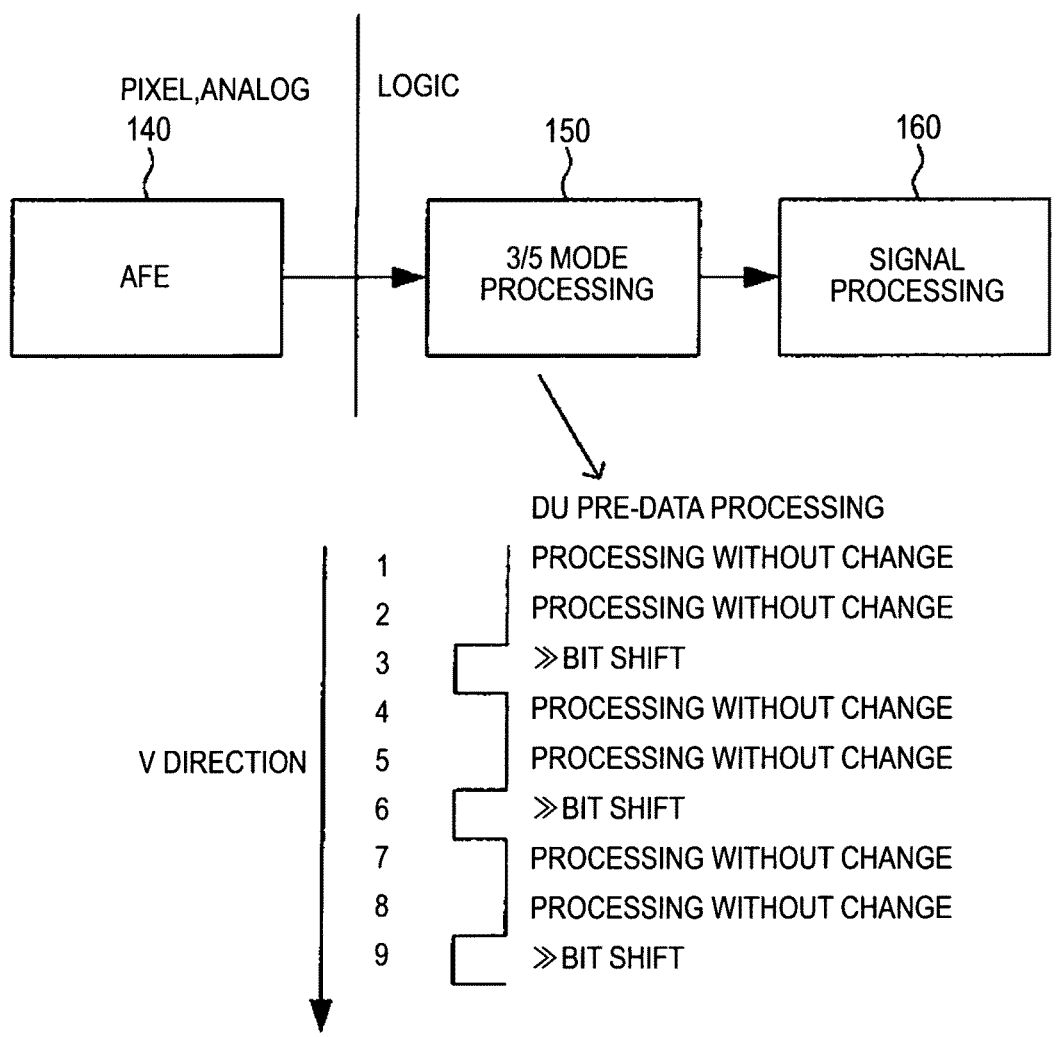
FIG. 9 is a diagram illustrating an example of pseudo ⅗ thinning-out reading signal processing.

FIG. 9 is a diagram illustrating an example of pseudo ⅗ thinning-out reading signal processing.

In this example, the processing is performed on digital signals. Thus, the first row L1 and the second row L2 are processed without change, the third row L3 is bit-shifted, the fourth row L4 and the fifth row L5 are processed without change, and the sixth row L6 is bit-shifted, and so on.

FIGS. 10A, 10B, and 10C are first diagrams illustrating a scaled image, an image subjected to normal thinning-out processing, and an image subjected to the pseudo thinning-out addition processing according to the embodiment in a comparative manner.

FIGS. 11A, 11B, and 11C are second diagrams illustrating, a scaled image, an image subjected to normal thinning-out processing, and an image subjected to the pseudo thinning-out addition processing according to the embodiment in a comparative manner.

FIGS. 10A and 11A show the scaled images, FIGS. 10B and 11B show images subjected to normal ⅗ thinning-out processing, and FIGS. 10C and 11C show an image subjected to the pseudo ⅗ thinning-out addition processing according to the embodiment.

As can be seen from the drawings, the quality of the image subjected to the pseudo ⅗ thinning-out addition processing according to the embodiment does not reach that of the scaled image, but is equal to or more than the quality of the image subjected to the normal thinning-out processing.

As described above, according to the embodiment, there are provided a vertical reading function of alternately reading pixel columns for which addition is vertically performed and pixel columns for which the addition is not performed, and a column reading function of changing the addition and normal reading whenever reading each single row in response to the scanning thereof.

Accordingly, according to the embodiment, without thinning out the pixels, by using all the pixels, it is possible to perform ⅔ thinning-out, ⅗ thinning-out, and the like.

Further, the CMOS image sensor according to the embodiment is not particularly limited. However, it may be possible to employ, for example, a CMOS image sensor equipped with a column-parallel analog-digital conversion device (hereinafter, simply referred to as ADC (Analog Digital Converter)).

<3. Other Exemplary Configurations of CMOS Image Sensor (Solid-State Imaging Device)>

FIG. 12 is a block diagram illustrating an exemplary configuration of a solid-state imaging device (a CMOS image sensor) equipped with column-parallel ADC according to the embodiment.

The solid-state imaging device 200 includes, as shown in FIG. 12, a pixel array section 210 as an imaging section, a row selection circuit 220 as a pixel driving circuit, a horizontal transfer scanning circuit 230, and a timing control circuit 240.

The solid-state imaging device 200 further includes an ADC group 250, a digital-analog conversion device (hereinafter, simply referred to as DAC (Digital Analog Converter)) 260, an amplifier circuit (S/A) 270, and a signal processing circuit 280.

The pixel array section 210 is configured such that, for example, the pixels, each of which includes a photodiode and an in-pixel amplifier as shown in FIG. 6, are arranged in a matrix shape.

Further, in the solid-state imaging device 200, the following circuits are disposed as control circuits for sequentially reading signals of the pixel array section 210.

Specifically, in the solid-state imaging device 200, as control circuits, there are disposed a timing control circuit 240 that generates an internal clock, a row selection circuit 220 that controls the row address and the row scan, and a horizontal transfer scanning circuit 230 that controls the column address and the column scan.

In addition, as the row selection circuit 220, the above-mentioned pixel driving circuit 120 is used.

In the ADC group 250 corresponding to the column reading circuit, the ADCs each having a comparator 251, a counter 252, and a latch 253 are arranged in a plurality of columns.

The comparator 251 compares the reference voltage Vslop, which has a RAMP waveform obtained when the reference voltage generated by the DAC 260 is changed stepwise, with the analog signal which can pass through the vertical signal line from each pixel for each row line.

The counter 252 counts time necessary for the comparing operation of the comparator 251.

The ADC group 250 has an n-bit digital signal conversion function, and is disposed for each vertical signal line (each column line), thereby constituting a column-parallel ADC block.

An output of each latch 253 is connected to a horizontal transfer line 290 which has, for example, a 2n-bit width.

In addition, there are disposed the 2n amplifier circuits 270 and signal processing circuits 280 corresponding to the horizontal transfer lines 290.

In the ADC group 250, the comparator 251, which is disposed for each column, compares the analog signal (the electric potential Vsl), which is read in the vertical signal line, with the reference voltage Vslop (a slope waveform which has a certain slope and is linearly changed).

At this time, the counter 252, which is disposed for each column similarly to the comparator 251, is operated. Thus, the counter value and the electric potential Vslop with the RAMP waveform change while corresponding one-to-one with each other, thereby converting the electric potential (the analog signal) Vsl of the vertical signal line into a digital signal.

The change of the reference voltage Vslop is that the change of the voltage is converted into a temporal change. Accordingly, by counting the time for a certain period (clock), conversion to the digital value is made.

When the analog electric signal Vsl intersects with the reference voltage Vslop, the output of the comparator 251 is inverted, and the input clock of the counter 252 is stopped, thereby completing the AD conversion.

After the end of the period of the above-mentioned AD conversion, the horizontal transfer scanning circuit 230 inputs the data, which is retained in each latch 253, to the signal processing circuit 280 through the horizontal transfer line 290 and the amplifier circuit 270, thereby generating a 2-dimensional image.

As described above, the column-parallel output processing is performed.

The solid-state imaging device having such an effect can be used as an imaging device of a digital camera or a video camera.

<4. Exemplary Configuration of Camera System>

Figure 13:
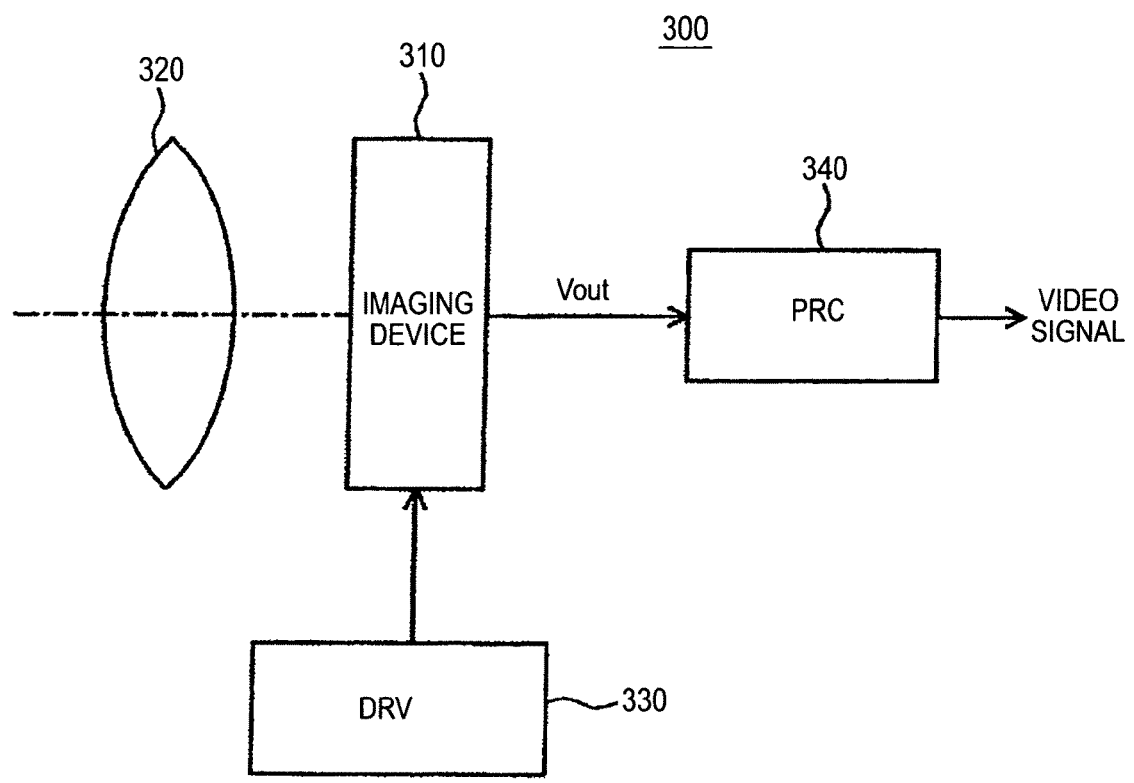
FIG. 13 is a diagram illustrating an exemplary configuration of a camera system using the solid-state imaging device according to the embodiments of the present disclosure.

FIG. 13 is a diagram illustrating an exemplary configuration of a camera system using the solid-state imaging device according to the embodiments of the present disclosure.

The camera system 300 includes, as shown in FIG. 13, an imaging device 310 to which the CMOS image sensors (the solid-state imaging devices) 100 and 200 according to the embodiments are applicable.

The camera system 300 further includes an optical system that guides incident light to (forms a subject image on) the pixel area of the imaging device 310, for example, a lens 320 that forms an image of the incident light (image light) on the imaging surface.

The camera system 300 further includes a driving circuit (DRV) 330 that drives the imaging device 310 and a signal processing circuit (PRC) 340 that processes an output signal of the imaging device 310.

The driving circuit 330 includes a timing generator (not shown) that produces various timing signals including a start pulse and clock pulses for driving the circuits in the imaging device 310. The driving circuit 330 drives the imaging device 310 by using predetermined timing signals.

Further, the signal processing circuit 340 performs predetermined signal processing on the output signal of the imaging device 310.

The image signal, which is processed by the signal processing circuit 340, is recorded in a recording medium such as a memory. The image information recorded on the recording medium is formed as a hard copy by using a printer or the like. Further, the image signal, which is processed by the signal processing circuit 340, is also displayed as video images on a monitor formed of a liquid crystal display or the like.

As described above, in an image capturing apparatus such as a digital still camera, by incorporating the above-mentioned solid-state imaging device 100 or 200 as the imaging device 310, it is possible to achieve a high-precision camera system.

The present disclosure contains subject matter related to that disclosed in Japanese Priority Patent Application JP 2010-157336 filed in the Japan Patent Office on Jul. 9, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel section comprising a plurality of pixels configured to convert optical signals into electric signals and accumulate the electric signals in accordance with an exposure period, the pixels arranged in a matrix; and
a pixel driving section configured to drive the pixel section to perform reset thereof and accumulate and output the electric signals,
wherein the pixel driving section includes
a vertical reading circuit configured to alternately perform an addition reading on pixel columns for which addition is vertically performed, and a normal reading on pixel columns for which addition is not performed, and
a column reading circuit configured to change between addition reading and normal reading when reading a single row in response to scanning of the vertical reading circuit, and
the pixel driving section configured to perform a first pseudo-thinning-out reading operation by reading all pixels without thinning out pixels in a reading target row.

2. The solid-state imaging device according to claim 1, wherein
the pixel driving section is configured to perform a second pseudo-thinning-out reading operation immediately following the first pseudo-thinning-out reading operation, and
the pixel driving section is configured to perform the normal reading at a boundary between the first pseudo-thinning-out reading operation and the second pseudo-thinning-out reading operation.

3. The solid-state imaging device according to claim 1, wherein the pixel section comprises a plurality of first-color pixels and a plurality of second-color pixels, and
the pixel driving section is configured to perform the first pseudo-thinning-out reading operation by alternately performing reading addition of the plurality of first-color pixels and reading addition of the plurality of second-color pixels.

4. The solid-state imaging device according to claim 3, wherein the pixel section comprises a sequence of alternating single rows of the first-color pixels and the second-color pixels alternately repeated, and
the pixel driving section is configured to perform the first pseudo-thinning-out reading operation by reading a plurality of rows of the first-color pixels or the second-color pixels as a single reading unit for the addition reading.

5. The solid-state imaging device according to claim 3, wherein the pixel section comprises a plurality of rows of the first-color pixels and a plurality of rows of the second-color pixels, and
the pixel driving section is configured to perform the first pseudo-thinning-out reading operation by initially performing the addition reading on the plurality of rows of the first-color pixels, subsequently performing the addition reading on the plurality of rows of the second-color pixels, and then performing the normal reading on a subsequent row of the first-color pixels.

6. The solid-state imaging device according to claim 5, wherein
the pixel driving section configured to perform a second pseudo-thinning-out reading operation immediately following the first pseudo-thinning-out reading operation by initially performing the addition reading on a plurality of additional rows of the second-color pixels, subsequently performing the addition reading on a plurality of additional rows of the first-color pixels, and then performing the normal reading on a subsequent row of the second-color pixels.

7. A camera system comprising:
a solid-state imaging device;
an optical system configured to form a subject image on the solid-state imaging device; and
a signal processing circuit configured to process an output image signal of the solid-state imaging device,
wherein the solid-state imaging device includes
a pixel section comprising a plurality of pixels configured to convert optical signals into electric signals and accumulate the electric signals in accordance with an exposure period, the pixels arranged in a matrix, and a pixel driving section configured to drive the pixel section to perform reset thereof and accumulate and output the electric signals, the pixel driving section includes
- a vertical reading circuit configured to alternately perform an addition reading on pixel columns for which addition is vertically performed, and a normal reading on pixel columns for which addition is not performed, and
- a column reading circuit configured to change between addition reading and normal reading when reading a single row in response to scanning of the vertical reading circuit, and the pixel driving section configured to perform a first pseudo-thinning-out reading operation by reading all pixels without thinning out pixels in a reading target row.

8. The camera system according to claim 7, wherein
the pixel driving section is configured to perform a second pseudo-thinning-out reading operation immediately following the first pseudo-thinning-out reading operation, and
the pixel driving section is configured to perform the normal reading at a boundary between the first pseudo-thinning-out reading operation and the second pseudo-thinning-out reading operation.

9. The camera system according to claim 7,
wherein the pixel section comprises a plurality of first-color pixels and a plurality of second-color pixels, and
the pixel driving section is configured to perform the first pseudo-thinning-out reading operation by alternately performing reading addition of the plurality of first-color pixels and reading addition of the plurality of second-color pixels.

10. The camera system according to claim 9,
wherein the pixel section comprises a sequence of alternating single rows of the first-color pixels and the second-color pixels alternately repeated, and
the pixel driving section is configured to perform the first pseudo-thinning-out reading operation by reading a plurality of rows of the first-color pixels or the second-color pixels as a single reading unit for the addition reading.

11. The camera system according to claim 9,
wherein the pixel section comprises a plurality of rows of the first-color pixels and a plurality of rows of the second-color pixels, and
the pixel driving section is configured to perform the first pseudo-thinning-out reading operation by initially performing the addition reading on the plurality of rows of the first-color pixels, subsequently performing the addition reading on the plurality of rows of the second-color pixels, and then performing the normal reading on a subsequent row of the first-color pixels.

12. The camera system according to claim 11, wherein
the pixel driving section configured to perform a second pseudo-thinning-out reading operation immediately following the first pseudo-thinning-out reading operation by initially performing the addition reading on a plurality of additional rows of the second-color pixels, subsequently performing the addition reading on a plurality of additional rows of the first-color pixels, and then performing the normal reading on a subsequent row of the second-color pixels.

13. A method of driving a solid-state imaging device comprising a pixel section including a plurality of pixels configured to convert optical signals into electric signals and accumulate the electric signals in accordance with an exposure period, the pixels arranged in a matrix, and a pixel driving section configured to drive the pixel section to perform reset thereof and accumulate and output the electric signals, the method comprising:
alternately performing, by a vertical reading circuit, an addition reading on pixel columns for which addition is vertically performed, and a normal reading on pixel columns for which addition is not performed, and
changing, by a column reading circuit, between addition reading and normal reading when reading a single row in response to scanning of the vertical reading circuit, and
performing a first pseudo-thinning-out reading operation by reading all pixels without thinning out pixels in a reading target row.

14. The method of driving a solid-state imaging device according to claim 13, further comprising
performing a second pseudo-thinning-out reading operation immediately following the first pseudo-thinning-out reading operation, and
performing the normal reading at a boundary between the first pseudo-thinning-out reading operation and the second pseudo-thinning-out reading operation.

15. The method of driving a solid-state imaging device according to claim 13,
wherein the pixel section comprises a plurality of first-color pixels and a plurality of second-color pixels, and
performing the first pseudo-thinning-out reading operation by alternately performing reading addition of the plurality of first-color pixels and reading addition of the plurality of second-color pixels.

16. The method of driving a solid-state imaging device according to claim 15,
wherein the pixel section comprises a sequence of alternating single rows of the first-color pixels and the second-color pixels alternately repeated, and
performing the first pseudo-thinning-out reading operation by reading a plurality of rows of the first-color pixels or the second-color pixels as a single reading unit for the addition reading.

17. The method of driving a solid-state imaging device according to claim 15,
wherein the pixel section comprises a plurality of rows of the first-color pixels and a plurality of rows of the second-color pixels, and
performing the first pseudo-thinning-out reading operation by initially performing the addition reading on the plurality of rows of the first-color pixels, subsequently performing the addition reading on the plurality of rows of the second-color pixels, and then performing the normal reading on a subsequent row of the first-color pixels.

18. The method of driving a solid-state imaging device according to claim 17, further comprising
performing a second pseudo-thinning-out reading operation immediately following the first pseudo-thinning-out reading operation by initially performing the addition reading on a plurality of additional rows of the second-color pixels, subsequently performing the addition reading on a plurality of additional rows of the first-color pixels, and then performing the normal reading on a subsequent row of the second-color pixels.

* * * * *